(12) United States Patent
Hatscher

(10) Patent No.: US 8,858,691 B2
(45) Date of Patent: Oct. 14, 2014

(54) ADSORBENTS FOR REMOVING CONTAMINANTS FROM GAS FLOWS CONTAINING WATER

(71) Applicant: Stephan Hatscher, Syke (DE)

(72) Inventor: Stephan Hatscher, Syke (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/061,807

(22) Filed: Oct. 24, 2013

(65) Prior Publication Data

US 2014/0103256 A1 Apr. 17, 2014

Related U.S. Application Data

(62) Division of application No. 13/140,072, filed as application No. PCT/EP2009/066808 on Dec. 10, 2009, now Pat. No. 8,597,407.

(30) Foreign Application Priority Data

Dec. 17, 2008 (EP) ..................................... 08171997

(51) Int. Cl.
   *B01D 53/02* (2006.01)

(52) U.S. Cl.
   USPC .................. 96/147; 95/90; 502/400; 502/406

(58) Field of Classification Search
   USPC .......................... 95/90; 96/147; 502/400, 406
   See application file for complete search history.

(56) References Cited

U.S. PATENT DOCUMENTS

| 4,608,360 A | * | 8/1986 | Abrevaya et al. | 502/226 |
| 7,781,368 B2 | * | 8/2010 | Schlitter et al. | 502/400 |
| 7,884,048 B2 | * | 2/2011 | Schlitter et al. | 502/400 |
| 8,022,264 B2 | * | 9/2011 | Hatscher et al. | 585/823 |
| 8,236,264 B2 | * | 8/2012 | Hatscher et al. | 423/247 |
| 2006/0035784 A1 | * | 2/2006 | Wessel et al. | 502/342 |
| 2009/0098036 A1 | * | 4/2009 | Hatscher et al. | 423/247 |

* cited by examiner

*Primary Examiner* — Christopher P Jones
(74) *Attorney, Agent, or Firm* — Drinker Biddle & Reath LLP

(57) ABSTRACT

The invention relates to adsorbents for removing impurities from water-comprising gas streams, in particular for use in fuel cell systems, wherein the adsorbents comprise oxides of elements selected from the group consisting of Cu, Fe, Zn, Ni, Co, Mn, Mg, Ba, Zr, Ce, La or combinations of these elements, have a copper oxide content of at least 30% by weight and have pore volumes of less than 0.175 ml·g$^{-1}$ for pores having a radius of less than 20 nm.

4 Claims, 10 Drawing Sheets

Recalcination at 450 °C

Recalcination at 550 °C

Recalcination at 650 °C

Recalcination at 750 °C

Recalcination at 850 °C

ADSORBENTS FOR REMOVING CONTAMINANTS FROM GAS FLOWS CONTAINING WATER

CROSS-REFERENCE TO RELATED APPLICATIONS

This application is a divisional of Ser. No. 13/140,072, filed Jun. 16, 2011, now U.S. Pat. No. 8,597,407, which is a national stage application (under 35 U.S.C. §371) of PCT/EP2009/066808, filed Dec. 10, 2009, which claims benefit of European application 08171997.3, filed Dec. 17, 2008. All of the details of those applications are incorporated herein by reference thereto.

BACKGROUND OF THE INVENTION

The present invention relates to adsorbents for removing impurities from water-comprising gas streams, in particular for use in fuel cell systems.

Natural gas and biogas are attractive hydrocarbonaceous gases which are very highly suitable for producing hydrogen-comprising gases for, for example, downstream fuel cell applications. Numerous processes are known for obtaining hydrogen from hydrocarbonaceous gases. Natural gas and also biogas, in addition to hydrocarbonaceous constituents, comprise numerous impurities such as sulfur-, silicon- and halogen-comprising compounds which are found at differing concentrations. In addition, further sulfur compounds must be added as odorants to commercial natural gas, which odorants are distinguished by a strong odor, in order to make unwanted gas escapes, for example, noticeable.

All known processes for producing a hydrogen-comprising gas stream have in common the fact that production thereof comprises at least one process stage in which a catalyst is used. All catalysts known therefor have the disadvantage of being poisoned, that is to say irreversibly deactivated, by sulfur compounds which are present in the gas streams. The poisoning leads to drastically lowered service lives and in the extreme case even to complete failure of the catalyst.

For economic operation of the recovery of hydrogen-comprising gases from hydrocarbonaceous gas streams it is therefore necessary to remove in particular the sulfur compounds present in the hydrocarbonaceous gases.

A general process for purifying gas streams is the adsorption of higher-molecular-weight constituents to chemical adsorbents or oxidizing agents, such as activated carbons or molecular sieves.

However, all these processes, depending on the operating conditions, suffer from disadvantages:

Physically acting absorbents, in the removal of sulfur compounds, also permit a substantial drying and removal of higher hydrocarbons. However, the processes only operate satisfactorily at correspondingly higher pressures.

In the case of processes which operate using chemically acting absorbents, pressure and temperature are not of prime importance. Usually, use is made of aqueous solvents such as monoethanolamine or diethanolamine in an order of magnitude of 2.5 to 5 n solutions, using which sulfur compounds are preferentially removed. The gases, after the treatment, are usually saturated with water vapor.

The known iron oxide and iron gelate processes use mostly iron gelate compounds, at which hydrogen sulfide is preferably converted to iron sulfide and water or elementary sulfur. The gases are in turn saturated with water vapor. Organic sulfur compounds are scarcely removed or not removed.

In the case of adsorption processes using solid adsorbents, use is made of adsorbents such as activated carbon, molecular sieves, carbon molecular sieves, silica gel, KC-Perlen, or mixtures thereof which, even in the presence of carbon dioxide, enable desulfurization with simultaneous removal of water vapor. However, the formation of COS from hydrogen sulfide and carbon dioxide is frequently observed as a side reaction.

In the case of the processes which operate using solid adsorbents, usually the raw gas stream is passed through an adsorber in which the solid adsorbent is situated. In the adsorbent bed, water vapor is adsorbed in the lower layer of the bed and the hydrocarbons are adsorbed in the upper layers. In the case of a possible regeneration, a substream of the raw gas is branched off, passed over a heater and heated to regeneration temperature. In the second adsorber the previously adsorbed hydrocarbons and water vapor are expelled. The departing desorption gas is subsequently passed over a cooler in which the adsorbed hydrocarbons and water vapor condense and are separated off in a downstream separator. The regeneration gas is then, after throttling the raw gas stream, added back to the raw gas stream which is passed over the adsorber which is being loaded and in which water and hydrocarbons are again adsorbed.

Depending on the site of origin and treatment, these gas streams still comprise differing concentrations of water. The concentration can also vary further as a result of external factors such as temperature and atmospheric humidity. Water, however, depending on the pore system of an adsorbent, leads to pore condensation. That is to say even far removed from the dew point, condensation of water can occur owing to capillary forces in the pore system of an adsorber. The water layer then prevents the contacting of impurity and active center on the adsorbent, and so its adsorption capacity falls drastically. In this case between 5 ppm up to several percentage points of water can be present in the gas stream.

The problems of sulfur removal in fuel cell systems are described extensively in the publication BWK 54 (2002) No. 9, pages 62-68. In this publication, again reference is made to the lack of a simple solution for removing all of the sulfur components from natural gas.

WO 2004/056949 introduces adsorbents for removing sulfur components from gases. In this publication, explicit consideration is given to non-zeolitic systems, the active component of which in most cases is Cu. These systems, as may be found in the examples, may readily be used in the purification of dry natural gas. Their use in water-comprising gases (moist natural gas, biogas or the like), however, is problematic, since the water which occurs here condenses in the small pores of the adsorbents and makes them inaccessible to chemisorption or physisorption.

TDA Research Inc. mentions in a publication (Am. Chem. Soc., Div. Fuel Chem. 50(2) (2005) 556ff.) the problems of removing sulfur components from water-comprising gas streams. The publication also shows a comparison with activated carbons (Norit RGM3 Activated Carbon) and zeolites (Grace). The SulfaTrap™ material introduced by TDA shows a capacity of less than $0.01\ kg_s \cdot 1_{cat}^{-1}$ and thereby not an approximately economic performance.

The problems in removing impurities from water-comprising gases are also described in DE-A-100 34 941. However, here, a processing solution for the problem is sought which plans for uneconomic residence times on the adsorbent and the additional use of molecular sieves, etc., for water removal.

Zeolitic systems, owing to their pore size, have a tendency to extreme uptake of water, in such a manner that their capacity for sulfur components is significantly decreased.

In the purification of biogases, a switch must frequently be made to significantly increased temperatures, in order to prevent pore condensation. The use of ZnO in such an application at T>300° C. is demonstrated in Energy&Fuels 18 (2004) 576ff. or else U.S. Pat. No. 4,871,710, example 1 (T=150° C.).

BRIEF SUMMARY OF THE INVENTION

The object was accordingly to provide a process for removing impurities from water-comprising gas streams, since typical sulfur adsorbents do not function in moist gas streams because they suffer from pore condensation.

The object has been achieved according to the invention by, for removing impurities from water-comprising gas streams, making use of adsorbents which comprise oxides of elements selected from the group consisting of Cu, Fe, Zn, Ni, Co, Mn, Mg, Ba, Zr, Ce, La or combinations of these elements and have pore volumes of less than $0.175$ mi·g$^{-1}$ for pores having a radius of less than 20 nm, wherein the adsorbent has a copper oxide content of at least 30% by weight.

The invention therefore relates to a process for removing impurities from water-comprising gas streams which comprises making use of adsorbents comprising oxides of elements selected from the group consisting of Cu, Fe, Zn, Ni, Co, Mn, Mg, Ba, Zr, Ce, La or combinations of these elements and have a copper oxide content of at least 30% by weight, which adsorbents have pore volumes of less than $0.175$ ml·g$^{-1}$ for pores having a radius of less than 20 nm.

BRIEF DESCRIPTION OF THE DRAWINGS

FIG. 1a shows the pore size distribution for example 1a.
FIG. 2a shows the pore size distribution for example 2a.

DETAILED DESCRIPTION OF THE INVENTION

Figure 1:
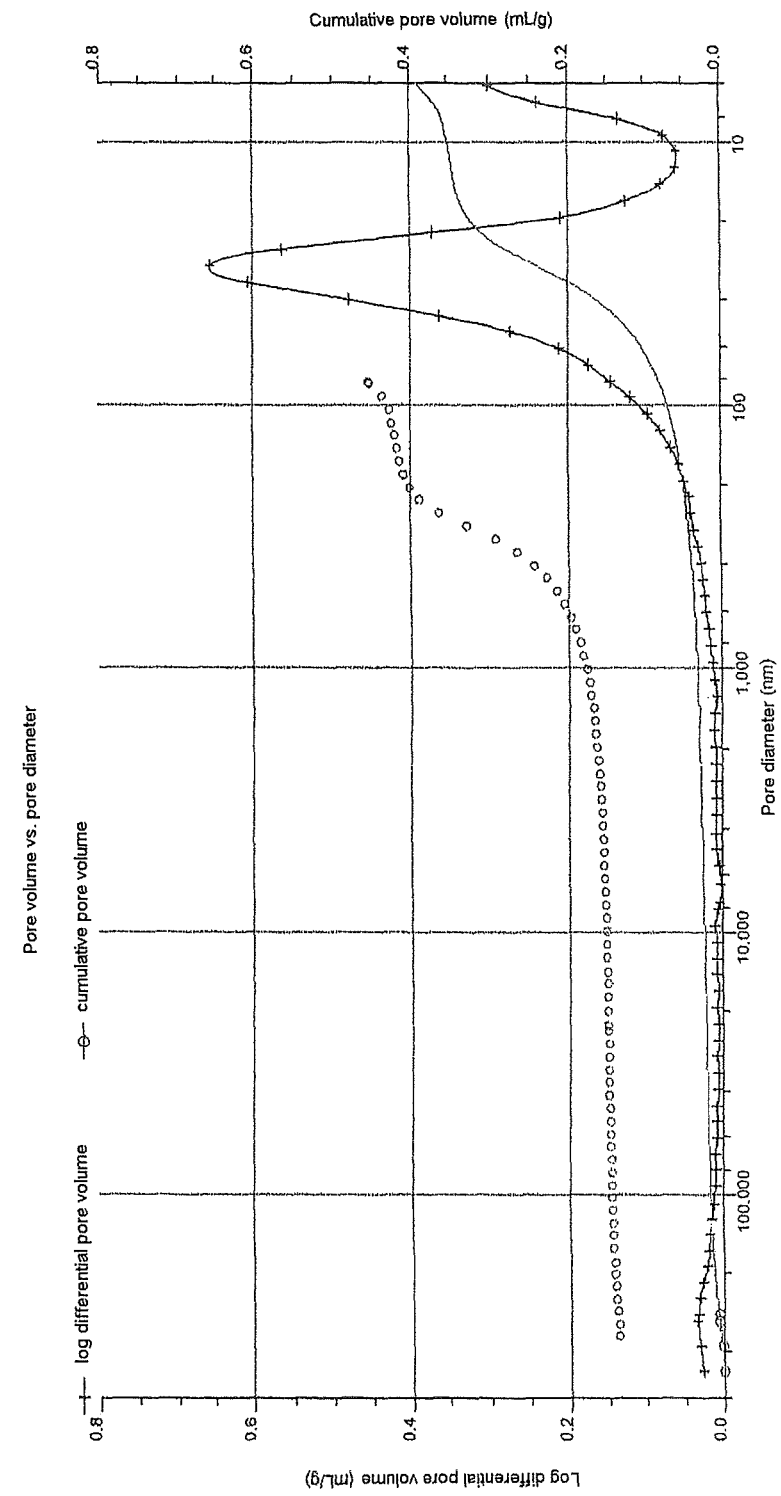
FIG. 1 shows the pore size distribution for the adsorber material without recalcination for example 1.
Figure 1A:
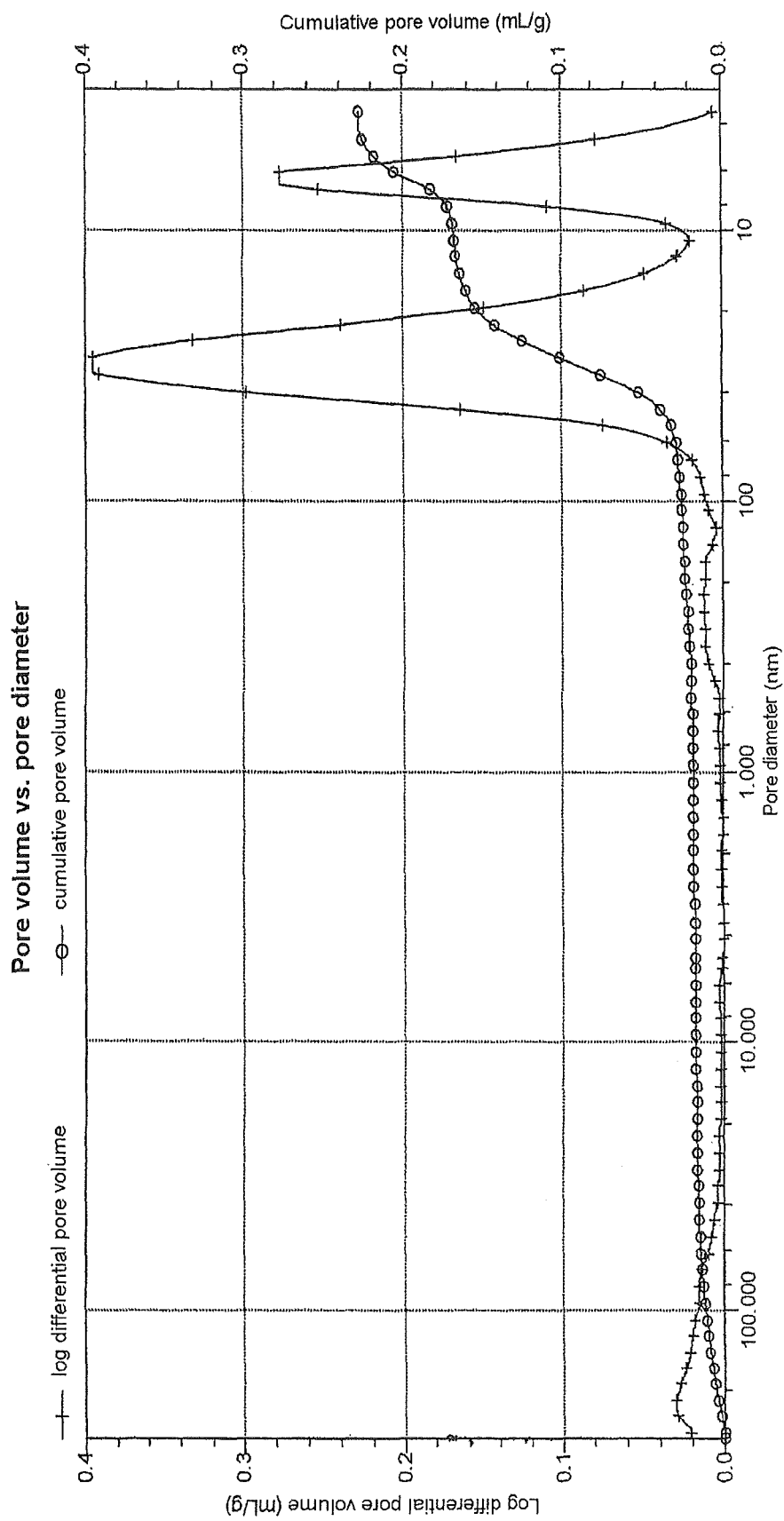
Figure 1B:
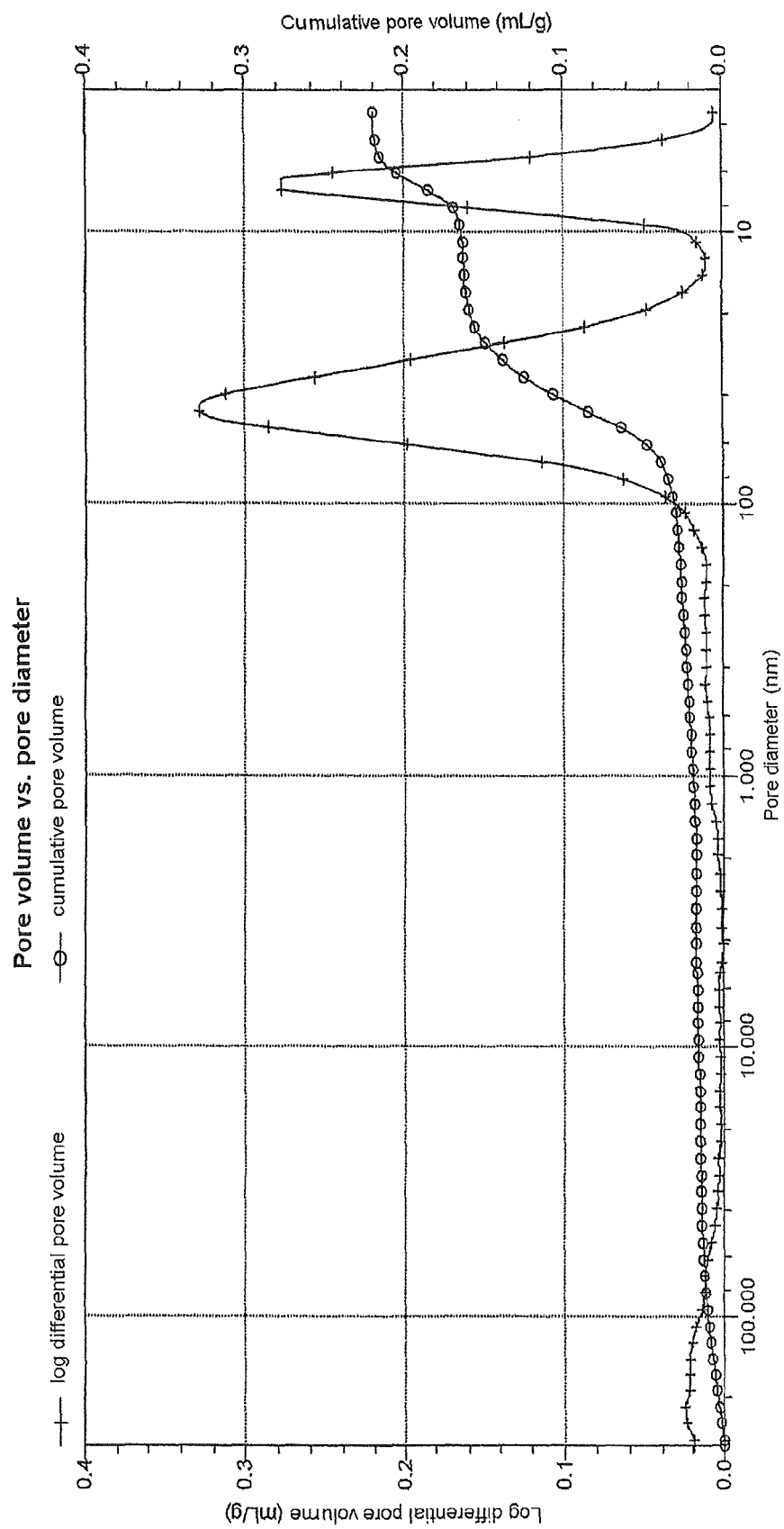
FIG. 1b shows the pore size distribution for example 1b.
Figure 1C:
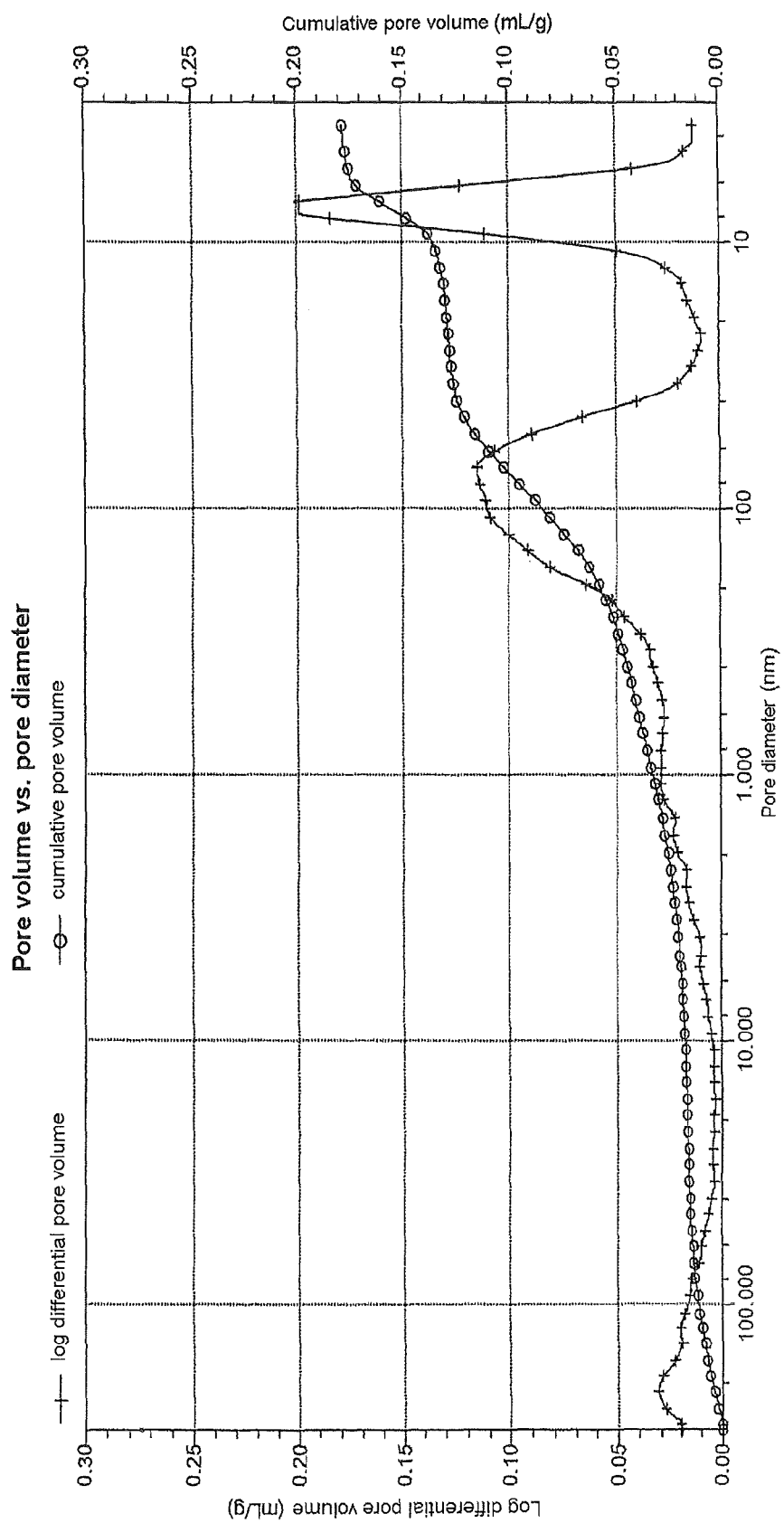
FIG. 1c shows the pore size distribution for example 1c.
Figure 1D:
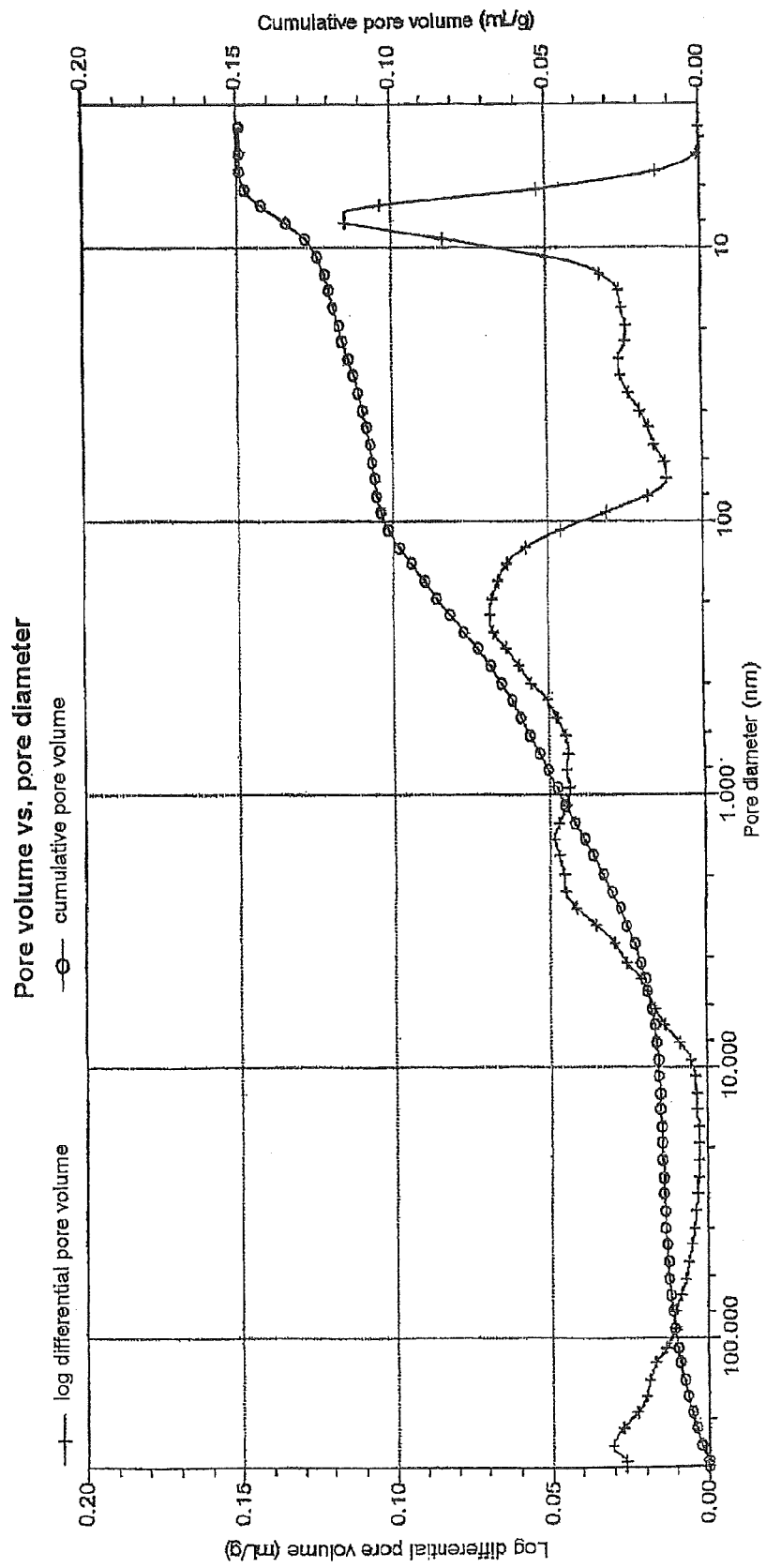
FIG. 1d shows the pore size distribution for example 1d.
Figure 1E:
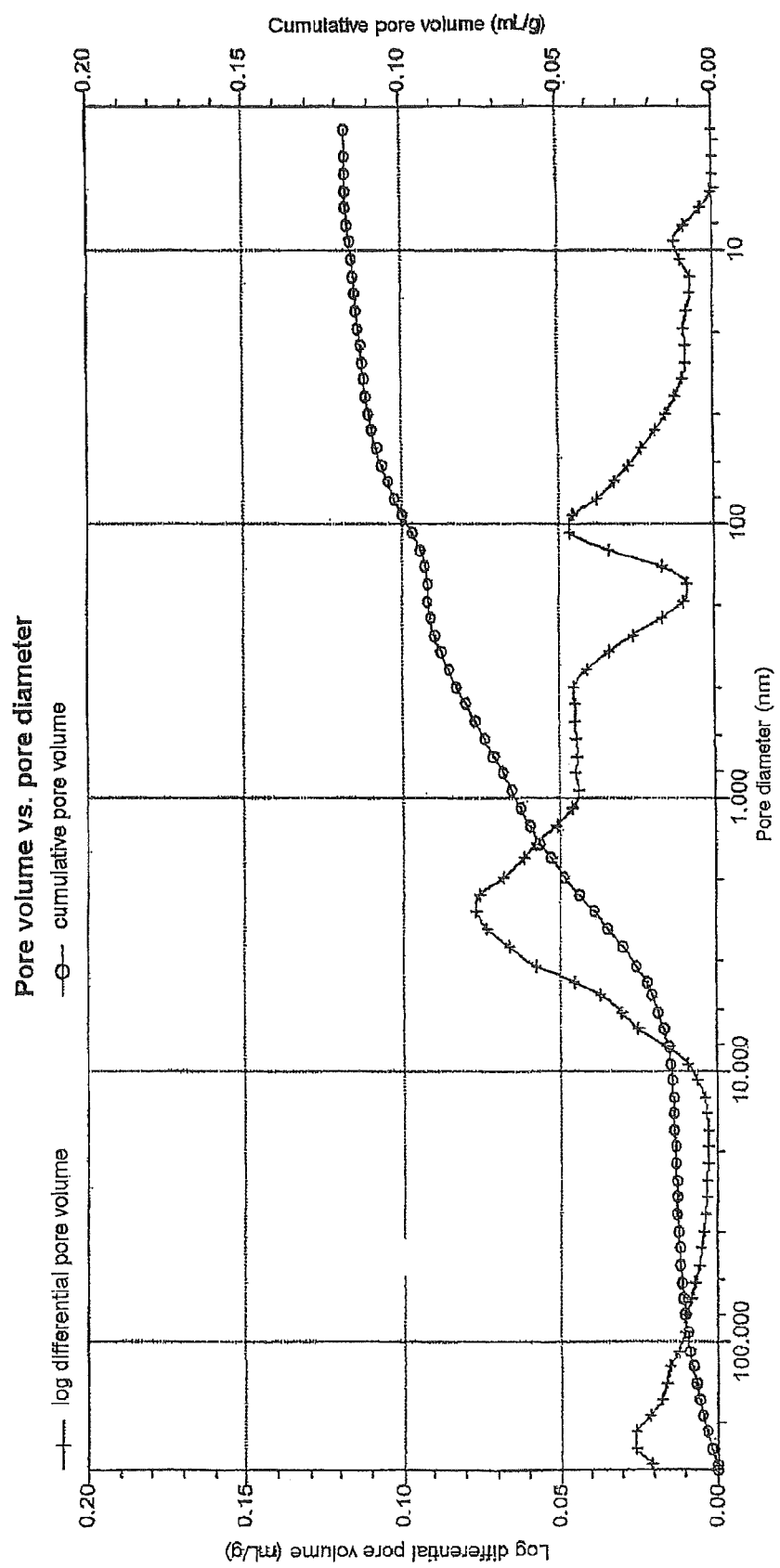
FIG. 1e shows the pore size distribution for example 1e.

The embodiments of the present invention may be found in the claims, the description and the examples. It is understood that the abovementioned features and the features still to be explained hereinafter of the subject matter according to the invention can be used not only in the combinations stated in each case, but also in other combinations without departing from the scope of the invention.

Impurities in the context of this invention are components which act in an interfering manner on the performance of process stages downstream of the purification stage. In detail these can be: sulfur components, such as hydrogen sulfide ($H_2S$), carbonyl sulfide (COS), carbon disulfide ($CS_2$), alkylmercaptans, thiol ethers, organic disulfides and thiophenes, silicon compounds, such as silanes, siloxanes and halosilicon, halogenated hydrocarbons, arsenic compounds and many more.

Water-comprising or moist according to this invention is taken to mean a material stream which comprises more than 5 ppm of water. The water content can lead up to saturation of the respective gas stream. A person skilled in the art can carry out the detection by suitable analysis (condensing out, freezing out, Karl-Fischer titration, etc.).

Water-comprising gas streams according to this invention are, for example, natural gas which, owing to transport or recovery, can perfectly well entrain several hundred ppm of water, or else biogases from fermentation or similar sources which, on account of the recovery process, mostly comprise water in gas form up to the degree of saturation (depending on temperature).

As a solution for the abovedescribed problem, it has surprisingly been found that adsorber materials which do not show any significant fraction of pore volumes in pores having radii in the range less than 20 nm, have significantly increased uptake capacities.

"No significant fraction" in the context of this invention means that the pores having a radius of less than 20 nm have a total pore volume of less than $0.175$ ml·g$^{-1}$.

The pore volume and pore volume distribution are determined by suitable methods, for example by mercury porosimetry.

Pores of a defined size can be generated or suppressed by techniques which are known to those skilled in the art.

It is possible, for example, by varying the calcination conditions to modify the pore structure of a shaped solid. Increasing the calcination temperature customarily shifts in this case the pore volume toward larger pore diameters. This phenomenon applies generally. This is verified in example 1 for a number of Cu—Zn—Al catalysts.

It is likewise possible by means of high energy input during tableting or during grinding and extruding to compact the catalyst mass in such a manner that certain pore sizes in the pore size distribution scarcely occur any longer.

In addition, materials which act as pore formers can be used in a targeted manner in order to achieve desired pore sizes. Such pore formers are graphite, sugars, celluloses or generally substances which decompose on calcination.

The production of adsorbents will be considered hereinafter.

The adsorbents which can be used for the process according to the invention comprise oxides of elements selected from the group consisting of Cu, Fe, Zn, Ni, Co, Mn, Mg, Ba, Zr, Ce and La. In this case, all desired combinations of these elements are likewise conceivable. Said elements are present in the adsorbent essentially, preferably completely, as oxides.

The adsorber materials used according to the invention comprise at least 30% by weight of CuO, particularly preferably at least 40% by weight of CuO, generally at most 90% by weight, in each case based on the total amount of the adsorption material.

Copper is present in the preferred dosage form preferably as oxide, but can also be in part or completely reduced to metallic copper. For the use according to the invention it is expedient if a substantial part of the copper is present as copper oxide. Copper oxide in addition offers the advantage that the adsorbers are insensitive to oxygen, whereas the reduced copper-comprising adsorbers react with atmospheric oxygen violently and with great heat development and are therefore a hazard potential.

For the adsorption activity it is less important whether copper is present as Cu(I) oxide or Cu(II) oxide.

As preferred second component, use is made of ZnO, preferably in an amount of at most 40% by weight, particularly preferably at most 30% by weight.

The adsorbents which can be used according to the invention can comprise other metal oxides of main group elements, subgroup elements and transition metals.

Particularly good adsorbents comprise other metal oxides. In this case preference is given to metal oxides which are distinguished by intrinsically high specific surface areas and a high temperature stability. Both properties lead to an improved dispersion of the copper oxide which leads to a higher specific surface area and therefore also to an improved adsorption activity. Typical representatives of such metal oxides are customary support materials such as aluminum oxide, zirconium oxide, titanium oxide and silicon oxide. Use can likewise be made of subgroup element oxides such as zinc oxide, molybdenum oxide, iron oxide, nickel oxide and chromium oxide. Said compounds, in both cases, however, are only a selection and in no way restrict the possible use of other metal oxides.

The adsorber material according to the invention can be present in pure form. However, it is also possible to mix other auxiliaries with the adsorber mass. Such auxiliaries have the aim of increasing or first making possible the shapability, for example, of the active mass. Likewise, the addition of binders or lubricants, such as are used during tableting, for the performance of the adsorber mass is not prohibitive and is permissible at any time. The same applies to the addition of organic or inorganic pore formers which are generally removed again in a separate step.

In such a composition of the adsorber, the pore structure may be optimized in such a manner that no intrinsically small pores occur which succeeds, in particular, using such other added compounds can have concentrations of at most 5% by weight (in the case of auxiliaries) or else up to 30% by weight (in the case of the use of support materials), in each case based on the total amount of the adsorption material.

The percentage amount of all components of the adsorption mass totals 100% by weight.

In a preferred embodiment of the process according to the invention, the adsorbent has a composition according to the general formula $(CuO)_x(ZnO)_y(Al_2O_3)1_{-(x+y)}$, where $0.5 \leq (x+y) \leq 0.9$, and also x and y are each $\geq 0.1$. In particular, it has a composition of 30% by weight to 50% by weight of CuO, 30% by weight to 45% by weight of ZnO and 5% by weight to 40% by weight of $Al_2O_3$. Particular preference is given to 35% by weight to 45% by weight of CuO, 35% by weight to 45% by weight of ZnO and 10% by weight to 30% by weight of $Al_2O_3$.

In a further preferred embodiment of the process according to the invention, the adsorbent has a composition of 50% by weight to 80% by weight of CuO, 10% by weight to 40% by weight of ZnO and 1% by weight to 10% by weight of $ZrO_2$. Particular preference is given to 60% by weight to 75% by weight of CuO, 20% by weight to 35% by weight of ZnO and 1% by weight to 10% by weight of $ZrO_2$.

In such a composition of the adsorber, the pore structure may be optimized in such a manner that no intrinsically small pores occur which succeeds, in particular, using adsorbers with a high copper content which comprise no aluminum oxide. Example 2a clearly demonstrates what high capacities (215 g of $H_2S/l_{catalyst}$) are achieved when tablets without addition of aluminum oxide are used. A cheaper alternative is the use of a Cu—Zn—Zr-based adsorber which was extruded with the addition of a little aluminum oxide as binder (example 2b). Here the capacity falls to 156 g of $H2S/l_{catalyst}$, but it is still significantly higher than in adsorbers of the prior art.

In a further preferred embodiment of the process according to the invention, the adsorbent has a composition of 30% by weight to 60% by weight of CuO, 10% by weight to 30% by weight of MgO and 10% by weight to 60% by weight of $SiO_2$. Particular preference is given to 40% by weight to 50% by weight of CuO, 10% by weight to 20% by weight of MgO and 20% by weight to 50% by weight of $SiO_2$.

Such adsorbers can comprise up to in total 5% by weight of $Cr_2O_3$ and/or BaO.

It is understood that the features of the adsorber material which are stated hereinbefore and are further stated hereinafter are usable not only in the stated combinations and ranges of values, but also in other combinations and ranges of values in the limits of the claims without departing from the scope of the invention.

The adsorbents used according to the invention are produced like customary oxidic catalysts in the manner known to those skilled in the art.

For example, they can be produced by impregnating the inert support material with the active metal oxides.

However, in the preferred case, an adsorber powder is produced by means of the following steps:

a) producing a solution of the components of the adsorption mass and/or soluble starting compounds thereof,
b) precipitating a solid from the solution by adding a base,
c) separating off the precipitated product,
d) washing the precipitated product,
e) drying the precipitated product and
f) optionally calcining the precipitated product.

In the first process step (step a), a solution of the components of the adsorption mass is produced in a conventional manner, for example by dissolution in an acid such as nitric acid. Optionally, instead of the components of the adsorption mass, their starting compounds are alternatively used, for example the nitrates, carbonates, hydroxycarbonates of the metals in an aqueous solution which can also be acidic, for example a nitric acid solution. The quantitative ratio of the salts in the solution is calculated stoichiometrically or set according to the desired final composition of the adsorption mass.

From this solution, in step b) a solid is precipitated as precursor of the adsorption mass. This proceeds in a conventional manner, preferably by elevating the pH by adding a base, for instance a solution of soda.

The resultant precipitated product is generally separated off from the supernatant solution, for example by filtering or decanting, and washed free from soluble constituents with water, before drying. The drying likewise proceeds using customary methods such as spray drying. This likewise applies to the possible calcination, for which use can be made of, e.g., rotary kilns or box ovens.

The powder thus produced can then be further processed to give shaped bodies, wherein, inter alia, the following steps are conceivable:

precompacting and tableting the pretreated powder to give tablets,
pasting, kneading/grinding and extruding to give rod-shaped extrudates,
pasting, kneading/grinding and extruding to give complex shaped bodies such as, e.g., monolithic structures,
applying the catalytically active mass to inert or likewise active supports.

The adsorber mass according to the invention can also, as mentioned, be deposited on a support. This is achieved by the customary impregnation processes or by precipitation coating. A precipitation coating process is taken to mean generally a process in which precipitation is carried out in the presence of a support or a support precursor.

A preferred impregnation process for producing supports used according to the invention is carried out using preshaped supports and advantageously comprises the following process steps in said sequence:

a) producing a solution of the components of the adsorption mass and/or of soluble starting compounds thereof,
b) impregnating the preshaped support with this solution,
c) drying the impregnated support and
d) calcining the impregnated and dried support.

Process step a) of this impregnation process is carried out like the abovedescribed step a) of the precipitation. In step b) the preshaped support is impregnated with a solution. The preshaped support has a shape selected in accordance with the purpose of use, for example rods or extrudates, tablets or else (spherical) pellets. The impregnation is carried out either from supernatant solution or as impregnation with the amount of solution corresponding to the pore volume of the support (incipient wetness). After the impregnation the impregnated support is dried and calcined in steps c) and d) like the precipitated product in the precipitation process. Using a preshaped support eliminates further steps of shaping.

The shaped bodies produced according to the processes described hereinbefore are calcined, preferably under air, but can alternatively be calcined under a non-oxidic atmosphere such as, e.g., nitrogen or argon. The calcination can also proceed in a plurality of steps, by, using what is termed recalcination, previously calcined shaped bodies being calcined again at a higher temperature or at the same temperature but for a longer period of time.

The production processes described are simple and inexpensive. The adsorbent according to the invention is highly active with respect to desulfurization of moist material streams, in particular natural gas and biogas. As the examples demonstrate, under the conditions specified there, for example a degree of desulfurization of water-saturated carbon-dioxide-comprising methane is achieved.

The adsorber materials described can be used in the process according to the invention for removing impurities from water-comprising gas streams.

In this process, in particular sulfur-comprising components are virtually completely removed from the gas. The special Cu-comprising catalysts adsorb not only inorganic sulfur compounds, such as $H_2S$ and COS, but also organic sulfur compounds, such as mercaptans, thiophenes or sulfides, but are also active with respect to silicon- and halogen-comprising impurities.

The materials used according to the invention act primarily as adsorbers, but can also act directly as a catalyst. Adsorption in this case designates the addition of an adsorbate from the gas phase to the surface of an adsorption mass, which is generally reversible by desorption. The adsorbate, however, can also be chemically reacted on the adsorbent. If the adsorbent in this case remains chemically unchanged, this is also termed catalysis. Both in the case of adsorption and catalysis, the initiating step is in each case adsorption, and whether the purification process in the final effect then operates catalytically or only by adsorption depends on the individual case. In the context of the present invention, it may be assumed that the adsorption of organic sulfur compounds is pure adsorption, whereas the adsorption of inorganic sulfur compounds can perfectly well also be described as catalysis, wherein in a step following the adsorption a chemical reaction can occur between the adsorbate and the adsorber. Examples which may be mentioned are:

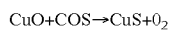
$$CuO+COS \rightarrow CuS+O_2$$

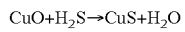
$$CuO+H_2S \rightarrow CuS+H_2O$$

In both cases, not only in pure adsorption, but also in the catalytic further reaction, the adsorbent is consumed, and thus the adsorption capacity can always be exhausted. In the case of an exhausted adsorber, this can be replaced by a fresh adsorber or regenerated again by means of special regeneration programs. The regeneration is usually achieved by passing a gas stream over the adsorber at a relatively high temperature which entrains from the adsorber the desorbing compounds. In individual cases, adsorbers must also be treated with special gas streams, e.g. for reoxidation or regeneration.

The adsorption mass shaped bodies are charged for use thereof into a container customarily termed "adsorber", occasionally also reactor, in which they are brought into contact with the material stream which is to be purified.

In the process according to the invention for removing impurities from water-comprising gas streams, the adsorbents are preferably arranged directly upstream of the fuel cell system following in the direction of gas flow. The adsorbents can be mounted in a suitable container (e.g. a cassette, a tube, a cartridge, etc.). In the process according to the invention, the water-comprising gas is passed over the adsorber materials preferably at room temperature. However, the process can also be operated at higher or lower temperatures.

In the process according to the invention, the water-comprising gas is freed from the impurities comprised therein, in particular sulfur compounds, and subsequently fed to a gas treatment system and/or fuel cell system which can have at least one of the (catalytic) process stages listed hereinafter, which are operated at differing temperature levels:
a) reforming,
b) high-temperature CO-shift,
c) low-temperature CO-shift,
d) CO selective oxidation/selective methanization,
e) fuel cell.

Preferably, the adsorber materials which are used according to the invention are arranged in the process in such a manner that an uncomplicated exchange of materials is possible. Advantageously, the necessary amount of adsorber materials is selected in such a manner that a change (necessitated by an exhausted uptake capacity for sulfur compounds) can be carried out in economically expedient intervals (e.g. annually).

The process according to the invention is suitable for stationary and non-stationary applications. In particular, it is planned for use in fuel cell systems. When the process according to the invention is used, the impurities, in particular sulfur-comprising compounds, are virtually completely removed from the water-comprising gas streams. Such compounds can be depleted to below 0.04 ppm, which permits use of the gas as fuel for fuel cells.

The invention will be described by the examples hereinafter which are not restricting:

EXAMPLE 1

Cu—Zn—Al Adsorber

An adsorbent of the composition $(CuO)_x(ZnO)_y(Al_2O_3)_{1-(x+y)}$ where $0.5 \leq (x+y) \leq 0.9$, and also x and y are each $\geq 0.1$ is produced for example in the following manner:

Copper(II) oxide and zinc(II) oxide are dissolved in dilute nitric acid in the fractions (x+y) necessary for the adsorber material and form solution A. In this solution A, 1−(x+y) fractions of aluminum oxide powder are suspended. Solution B is produced by dissolving soda in demineralized water. The two solutions A and B are combined via a pump device in a precipitation pot filled with warm water at 50° C. and the pH is adjusted to be slightly acidic. After precipitation is completed, the mixture is further stirred for several hours and the light-blue suspension is filtered through a vacuum filter and washed nitrate-free with water. The powder obtained after drying of the filtercake is recalcined at a maximum 500° C.

In accordance with the abovedescribed production protocol, an adsorbent of the composition of 40% by weight of CuO, 40% by weight of ZnO and 20% by weight of $Al_2O_3$ was produced by dissolving 120 g of copper(II) oxide and 120 g of zinc oxide in dilute nitric acid. Into the corresponding solution A, 60 g of aluminum oxide were dispersed and stirred for one hour. Solution B was produced by dissolving 470 g of soda in 2 l of demineralized water. The pH was adjusted to 6.5, and the temperature was kept at 50° C. After precipitation was completed, the product was further stirred for 3 hours still at constant pH and constant temperature. The light-blue suspension was then filtered through a vacuum filter and washed with a total of 100 l of water which took about 3 hours. After the filtercake was dried, 350 g of precursor were obtained. The dried powder was calcined in a muffle furnace, wherein the maximum calcination temperature was 300° C. This temperature was held for 2 h. At the end of the calcination, at which the majority of the basic metal carbonates had decomposed, 235 g of metal oxide still remained.

This powder was compacted to form tablets on a tableting machine with addition of 1% by weight of graphite. The tablets were subsequently mechanically pressed through a sieve <1.6 mm, again admixed with 2% by weight of graphite and pressed to form tablets of dimensions 5×3 mm. For examples Ia-e, these tablets were crushed to form 1-2 mm chips and recalcined at the temperature stated in each case.

The adsorber materials without recalcination showed the pore size distribution given in FIG. 1 and had the following parameters:
0.200 ml·g$^{-1}$ pore volume for pores where r<20 nm,
Total pore volume 0.2464 ml·g$^{-1}$,
in each case determined by mercury porosimetry.

EXAMPLE I a

The adsorber material of example 1 was recalcined at 450° C. for 2 hours.

It showed the pore size distribution given in figure Ia and had the following parameters:
0.071 ml·g$^{-1}$ pore volume for pores where r<20 nm,
Total pore volume 0.2276 ml·g$^{-1}$.

EXAMPLE Ib

The adsorber material of example 1 was recalcined at 550° C. for 2 hours.

It showed the pore size distribution given in figure Ib and had the following parameters:
0.063 ml·g$^{-1}$ pore volume for pores where r<20 nm,
Total pore volume 0.2202 ml·g$^{-1}$.

EXAMPLE 1 c

The adsorber material of example 1 was recalcined at 650° C. for 2 hours.

It showed the pore size distribution given in figure Ic and had the following parameters:
0.049 ml·g$^{-1}$ pore volume for pores where r<20 nm,
Total pore volume 0.1786 ml·g$^{-1}$.

EXAMPLE 1 d

The adsorber material of example 1 was recalcined at 750° C. for 2 hours.

It showed the pore size distribution given in figure id and had the following parameters:
0.032 ml·g$^{-1}$ pore volume for pores where r<20 nm,
Total pore volume 0.1492 ml·g$^{-1}$.

EXAMPLE 1 e

The adsorber material of example 1 was recalcined at 850° C. for 2 hours.

It showed the pore size distribution given in FIG. 1 e and had the following parameters:
0.005 ml·g$^{-1}$ pore volume for pores where r<20 nm,
Total pore volume 0.1170 ml·g$^{-1}$.

EXAMPLE 2

Cu—Zn—Zr Adsorber

An adsorbent of the composition 73.9% by weight of CuO; 21.1% by weight of ZnO and 5% by weight of $ZrO_2$ was produced as follows: 370 g of copper(II) oxide were dissolved in dilute nitric acid. Likewise, 105.5 g of zinc oxide were dissolved in a nitric acid solution. As third component, a nitric acid solution having a metal ion concentration of 11.2% by weight was produced by dissolving 25 g of zirconium carbonate (solids fraction 41.1% by weight). The three solutions thus produced were combined and formed solution A. Solution B was produced by dissolving 474 g of soda in 2 l of demineralized water. Both solutions were passed via a peristaltic pump into a precipitation pot in which there was an initial water charge at 70° C. The pH was adjusted to 6 to 7, the temperature was held at 70° C. After precipitation was completed, the product was further stirred for 2 hours still at constant pH and constant temperature. The light-blue suspension was subsequently filtered on a vacuum filter and washed with in total 120 l of water. After the filtercake was dried, approximately 700 g of precursor were obtained. The dried powder was calcined in a muffle furnace, wherein the maximum calcination temperature was 300° C. At the end of the calcinations, at which a majority of the basic metal carbonates had decomposed, approximately 500 g of metal oxide still remained.

EXAMPLE 2a

The metal oxide powder of example 2 was compacted to form tablets on a tableting machine with addition of 1% by weight of graphite. The tablets were subsequently mechanically forced through a sieve <1.6 mm, again admixed with 2% by weight of graphite and pressed to form tablets of dimensions 5×3 mm (diameter×height). The finished tablets which had a lateral compressive strength of 66 N/tablet and a loss on ignition of 14% by weight were processed to give chips of a particle size fraction 1.0-2.0 mm for measurement.

Figure 2A:
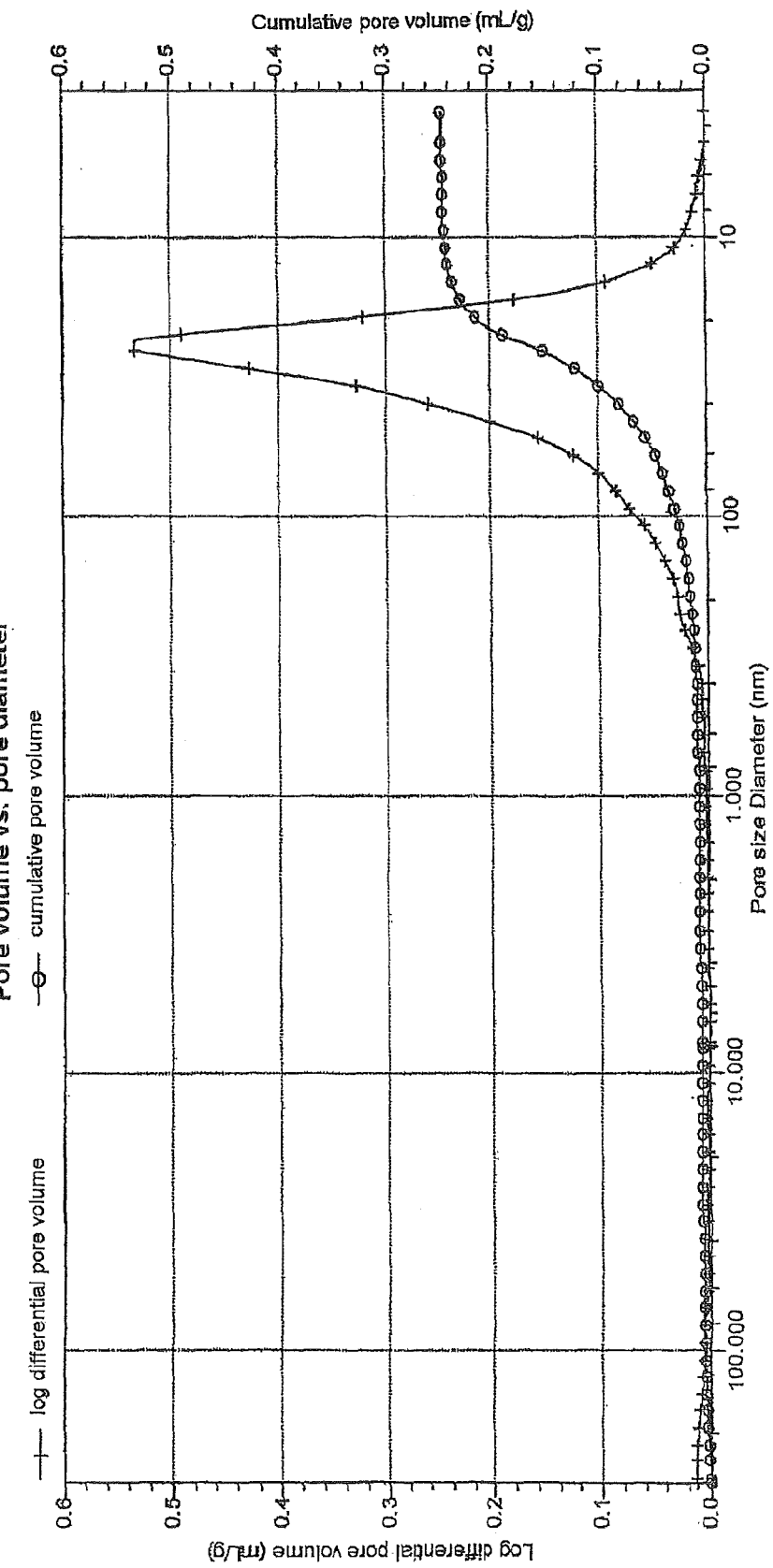

The material showed the pore size distribution given in FIG. 2a and had the following parameters:
0.025 ml·g$^{-1}$ pore volume for pores where r<20 rim,
Total pore volume 0.250 ml·g$^{-1}$.

EXAMPLE 2b

The metal oxide powder of example 2 was mixed together with 20% by weight of an aluminum oxide binder, admixed with water and thereafter the extrudable mass was shaped to form 2 mm rods. The rods were dried at 120° C. and subsequently calcined at 450° C.

Figure 2B:
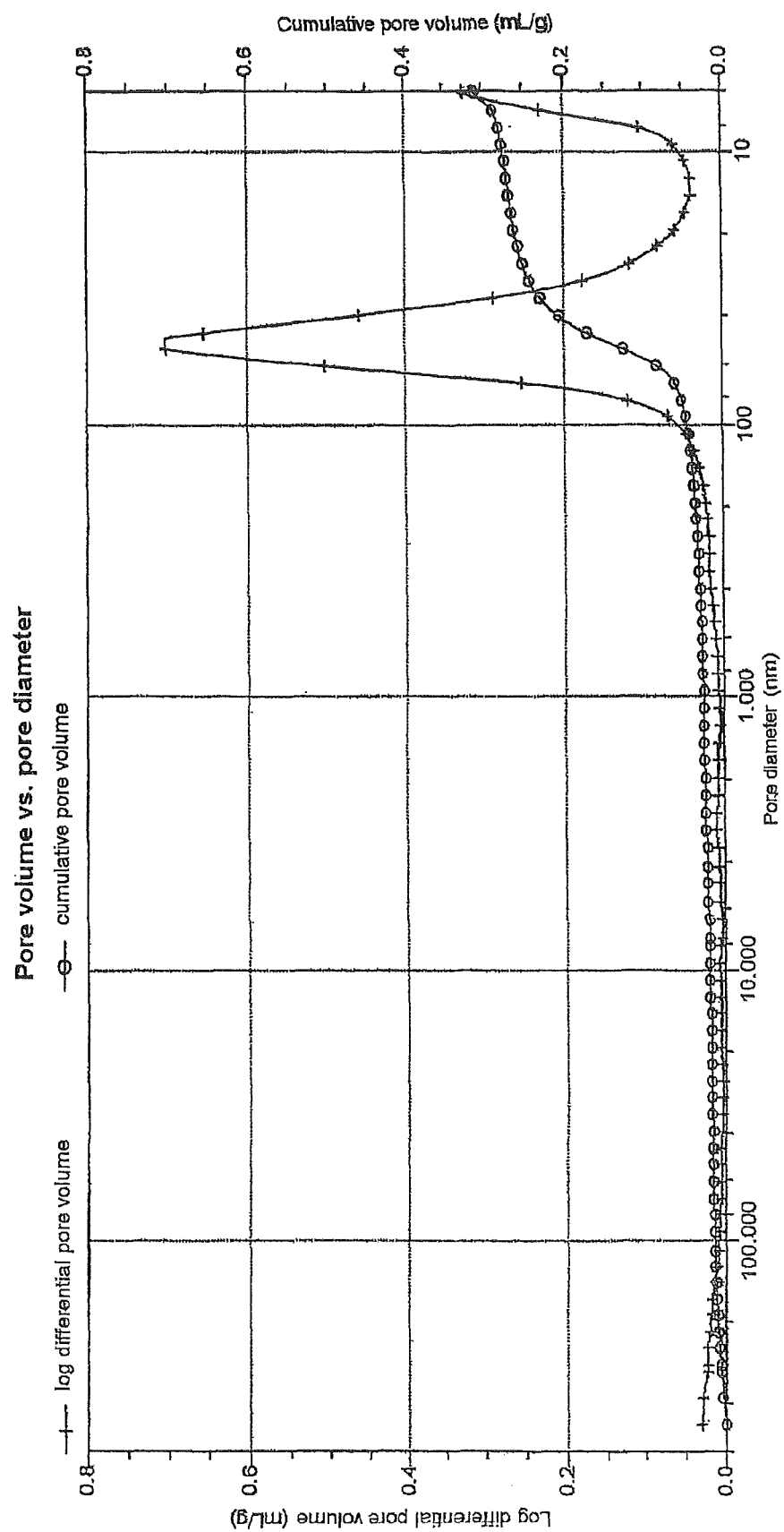
FIG. 2b shows the pore size distribution for example 2b.

The material showed the pore size distribution given in FIG. 2b and had the following parameters:
0.062 ml·g$^{-1}$ pore volume for pores where r<20 nm,
Total pore volume 0.389 ml·g$^{-1}$.

EXAMPLE 3

Cu—Mg-Silicate Adsorber

Figure 3:
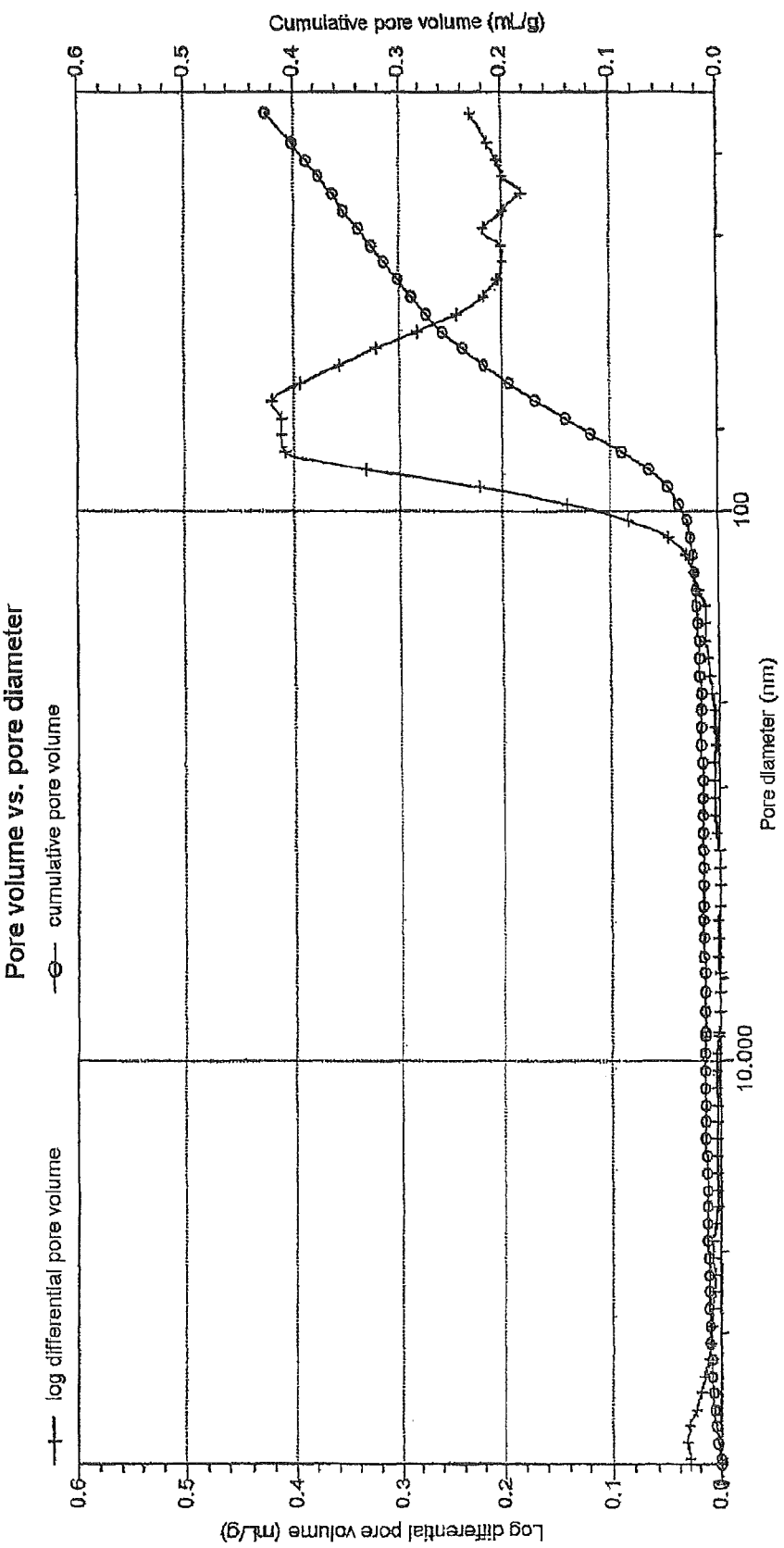
FIG. 3 shows the pore size distribution for example 3.

An adsorbent was obtained by precipitating an active mass of 46% by weight of CuO, 16% by weight of MgO, 34% by weight of SiO$_2$, 1% by weight of Cr$_2$O$_3$, 1% by weight of BaO, 2% by weight of minor components.
The material showed the pore size distribution given in FIG. 3 and had the following parameters:
0.145 ml·g$^{-1}$ pore volume for pores where r<20 nm,
Total pore volume 0.335 ml·g$^{-1}$.

EXAMPLE 4

Figure 4:
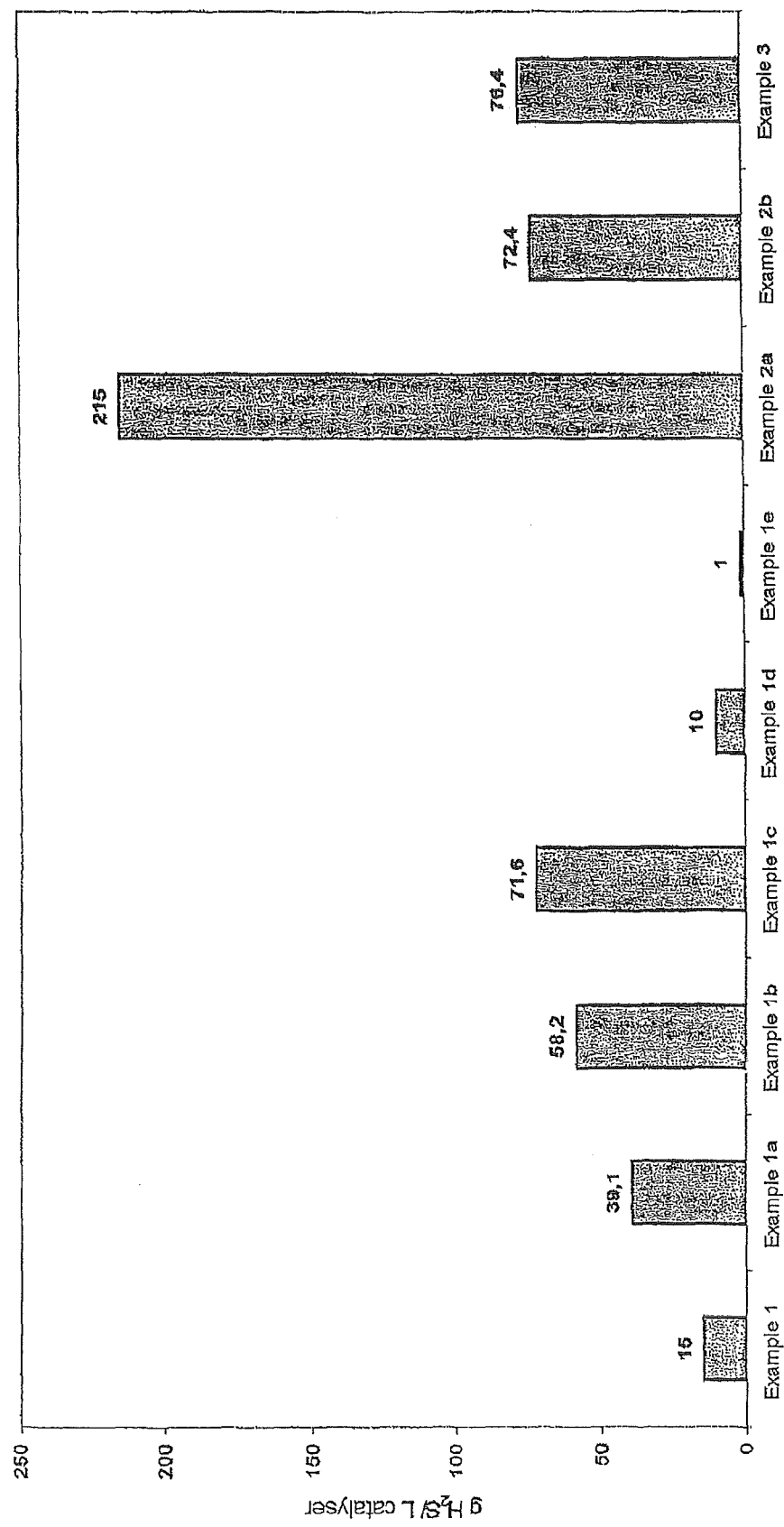
FIG. 4 shows the uptake capacity (as end of the capacity, a breakthrough of more than 0.5 ppm of H2S was selected).

The adsorber materials of examples Iae, 2a, 2b and 3 were tested for their uptake capacity for H2S.
For this, the respective adsorber material was crushed to form 1 to 2 mm chips. 40 ml of the chips were installed in each case into a reactor and charged with a mixture of 150 Nl/h natural gas, 100 Nl/h CO$_2$, ~4 Nl/h of water vapor and 500 ppm of H$_2$S at room temperature. The water vapor was added by introducing the natural gas and CO2 stream through a water-filled saturator at room temperature. The GHSV was 6250 h$^{-1}$. FIG. 4 shows the uptake capacity (as end of the capacity, a breakthrough of more than 0.5 ppm of H2S was selected).

The invention claimed is:

1. Adsorbents comprising oxides of elements selected from the group consisting of Cu, Fe, Zn, Ni, Co, Mn, Mg, Ba, Zr, Ce, La or combinations of these elements, which adsorbents have a copper oxide content of at least 30% by weight and have pore volumes of less than 0.175 ml·g$^{-1}$ for pores having a radius of less than 20 nm which adsorbents are obtained by a process comprising the following steps:
   a) producing a solution of the components of the adsorption mass and/or of soluble starting compounds thereof,
   b) precipitating a solid from the solution by adding a base,
   c) separating off the precipitated product,
   d) washing the precipitated product,
   e) drying the precipitated product,
   f) calcining the precipitated product to form a pretreated powder,
   g) precompacting and tableting the pretreated powder to give tablets, and
   h) recalcination of the tablets at a temperature up to 650° C.

2. Adsorbents according to claim 1, comprising 30% by weight to 50% by weight of CuO, 30% by weight to 45% by weight of ZnO and 5% by weight to 40% by weight of Al$_2$O$_3$.

3. Adsorbents according to claim 1, comprising 50% by weight to 80% by weight of CuO, 10% by weight to 40% by weight of ZnO and 1% by weight to 10% by weight of ZrO$_2$.

4. Adsorbents according to claim 1, comprising 30% by weight to 60% by weight of CuO, 10% by weight to 30% by weight of MgO and 10% by weight to 60% by weight of SiO$_2$.

* * * * *